United States Patent
Sallows et al.

(10) Patent No.: US 6,712,244 B1
(45) Date of Patent: Mar. 30, 2004

(54) DISPENSING DEVICE

(75) Inventors: Geoffrey Sallows, Seaford (GB); David Grant Barnett, Seaford (GB); Etienne Vincent Bunoz, Eastbourne (GB); John Frayn Ewans, High Wycombe (GB)

(73) Assignee: Brightwell Dispensers Limited, Newhaven (GB)

( * ) Notice: Subject to any disclaimer, the term of this patent is extended or adjusted under 35 U.S.C. 154(b) by 0 days.

(21) Appl. No.: 09/959,788

(22) PCT Filed: Apr. 28, 2000

(86) PCT No.: PCT/GB00/01641

§ 371 (c)(1),
(2), (4) Date: Jan. 25, 2002

(87) PCT Pub. No.: WO00/68653

PCT Pub. Date: Nov. 16, 2000

(30) Foreign Application Priority Data

May 7, 1999 (GB) .............................................. 9910468

(51) Int. Cl.[7] .................................................. B67D 5/40
(52) U.S. Cl. ..................... 222/375; 222/383.1; 222/384
(58) Field of Search ............................. 222/375, 383.1, 222/384

(56) References Cited

U.S. PATENT DOCUMENTS 1,863,754 A * 6/1932 Lissauer et al. ............ 222/340
1,897,154 A * 2/1933 Van Schyndle et al. .... 222/205
1,913,062 A * 6/1933 Wheeler ...................... 222/47
3,873,007 A * 3/1975 Christine et al. ........... 222/309
5,482,187 A * 1/1996 Poulsen et al. ............. 222/207

FOREIGN PATENT DOCUMENTS

| EP | 0523765 A | 1/1993 |
| GB | 1564910 A | 4/1980 |
| WO | 97/23156 A | 7/1997 |

* cited by examiner

Primary Examiner—Gene Mancene
Assistant Examiner—Melvin A. Cartagena
(74) Attorney, Agent, or Firm—Levy & Grandinetti

(57) ABSTRACT

A dispensing device for dispensing a measured quantity of a concentrated cleansing liquid into a spray bottle or any other suitable receptacle, is provided with means for pumping the measured quantity of the liquid from a source into a holding reservoir. The dispensing device includes inhibiting means for preventing the interruption of a priming stroke as the liquid is pumped from the source into the reservoir and for preventing the interruption of a delivery stroke as the liquid is pumped from the reservoir to the receptacle. The inhibiting means includes a pivotable lever having an arcuate rib engaged by a pair of locking members arranged to engage opposite tracks of the arcuate rib.

12 Claims, 7 Drawing Sheets

DISPENSING DEVICE

Priority is claimed to PCT/GB00/01641 filed Apr. 28, 2000, which claims priority to Great Britain Application Number 9910468.9 filed May 7, 1999.

BACKGROUND OF THE INVENTION

1. Field of the Invention

This invention is concerned with improvements in a dispensing device and is particularly concerned with the dispensing of a metered quantity of a liquid from the dispensing device in an uninterrupted method of operation of the dispensing device.

2. Description of the Related Art

Cleansing products are commonly supplied as a liquid in concentrated form which requires dilution with water before use. Thus, a measured quantity of the cleansing product is added to a known quantity of water for the most efficacious result.

Normally, the measured quantity of the concentrated cleansing product is introduced into a conventional graduated spray bottle which is thereafter filled with water. The water/cleansing product mixture may entirely fill the spray bottle, or, the water may be added until an appropriate graduation mark is reached by the water/cleansing product mixture.

Similarly, a measured quantity of a concentrated cleansing product may be introduced into any suitable receptacle in which, or into which, a requisite amount of water is provided. If an operative complies with the requirements for achieving the most advantageous mixture, there is little likelihood that any damage may be caused to the surfaces being cleaned or that the health of the operative may be put at risk if they are subjected to concentrations of the mixture above the recommended dosage levels.

Unfortunately, it is human nature to believe that the efficacy of a mixture may be enhanced by increasing the dosage levels of a concentrate in a mixture. Thus, an operative may add double or more of the recommended dosage of a concentrated cleansing product to a mixture with deleterious results.

BRIEF SUMMARY OF THE INVENTION

The objects of the present invention are therefore to overcome or mitigate the drawbacks of known dispensing devices and their method of operation.

Thus the present invention conveniently provides a dispensing device for delivering a metered quantity of a liquid, the dispensing device comprising a reservoir, priming means for priming the reservoir, when the dispensing device is in use, with a metered quantity of a liquid, the dispensing device also comprising a delivery means for delivering, when the dispensing device is in use, said metered quantity of said liquid from the reservoir, characterised in that, the dispensing device further comprises inhibiting means for:

a) preventing the interruption and reversal of a priming stroke of the priming means; and, b) preventing the interruption and reversal of a delivery stroke of the delivery means, and wherein the priming and delivery means comprises a lever pivotally mounted on the dispensing device, characterised in that the lever includes at least two arcuate surfaces and the inhibiting means comprises at least two locking members located one each adjacent a respective one of the arcuate surfaces, wherein, when the dispensing device is in use, the locking members operate in concert and are moved between:

a) a first operative condition in which a first arcuate surface engaging portion of each locking member is brought into engagement with its respective arcuate surface to prevent the interruption and reversal of the priming stroke of the priming means until the priming stroke thereof is completed; and, b) a second operative condition in which a second arcuate surface engaging portion of each locking member is brought into engagement with its respective arcuate surface to prevent the interruption and reversal of the delivery stroke of the delivery means until the delivery stroke is completed.

Preferably, the locking members each comprise a triangular block pivotally mounted on the dispensing device, wherein when the dispensing device is in use, the triangular blocks are moved simultaneously into their first operative condition or into their second operative condition by spring means.

Conveniently, the spring means comprises a generally "C" shaped leaf spring opposite ends of which leaf spring are arranged to act one on each of the triangular blocks respectively to urge the triangular blocks into their first operative condition or their second operative condition at or towards opposite ends of the arcuate surfaces associated therewith.

Preferably, the dispensing device comprises stop elements located at the opposite ends of the arcuate surfaces, the stop elements being effective, when the dispensing device is in use:

a) to engage the triangular blocks at a first end of the arcuate surfaces to cause the triangular blocks to pivot simultaneously about their respective fulcrum points into their first operative condition in which they are set to prevent the interruption and reversal of a subsequent priming stroke of the priming means; or, b) to engage the triangular blocks at a second end of the arcuate surfaces to cause the triangular blocks to pivot simultaneously about their respective fulcrum points into their second operative condition in which they are set to prevent the interruption and reversal of a subsequent delivery stroke of the delivery means.

Conveniently, the relative positions of the respective stop elements at the opposite ends of the arcuate surfaces are variable in order to alter the length of the priming and delivery strokes of the priming and delivery means respectively.

Preferably, the arcuate surface engaging portions of the triangular blocks and/or the respective arcuate tracks engaged thereby are each provided with a friction coat or surface finish to enhance the locking engagement of the triangular blocks with their respective arcuate surfaces should an operative try to interrupt and reverse the priming or delivery strokes of the priming means or the delivery means respectively when the dispensing device is in use.

In one embodiment, provided by the present invention the lever includes two arcuate surfaces formed one on either side of an arcuate rib formed integrally with the lever, and a centre of curvature of the arcuate rib is coincident, or substantially so, with a pivotal axis of the lever.

Preferably, the dispensing device comprises one locking member provided by a triangular block on opposite sides of the arcuate rib adjacent their respective arcuate surfaces of the arcuate rib.

Conveniently, the dispensing device comprises an override means for engagement with the triangular blocks, when the dispensing device is in use, to move the triangular blocks into inoperative conditions in which arcuate surface engaging portions of the triangular blocks are held out of engagement with a respective one of the arcuate surfaces.

The present invention also provides a method of dispensing a metered quantity of a liquid from a dispensing device, the method comprising the steps of priming a reservoir with a metered quantity of the liquid and delivering the metered quantity of the liquid from the reservoir characterised in that the method also comprises the steps of:

a) preventing the interruption and reversal of the priming stroke until the reservoir has received the full metered quantity of the liquid; and, b) preventing the interruption and reversal of the delivery stroke until the reservoir has been emptied of the full metered quantity of the liquid.

There now follows by way of example of the invention a detailed description of a dispensing device and its method of operation which description is to be read with reference to the accompanying drawings in which:

FIG. 1 is a side view of the dispensing device shown in an inoperative condition;

FIG. 2 is a front view of the device of FIG. 1 as seen in the direction of the arrow II in FIG. 1;

FIG. 3 is a side view corresponding to FIG. 1 with the dispensing device shown in a first operative condition;

FIG. 4 is a side view corresponding to FIGS. 1 and 3 with the dispensing device shown in a second operative condition;

FIG. 5 is a plan view of the device as seen in the direction of the arrow V in FIG. 2;

FIG. 6 is a fragmentary view of some of the parts shown in FIG. 1 and also showing an over-ride key for negating the inhibiting means of the dispensing device; and, FIG. 7 is a side view of a lever of a priming and delivery means of the dispensing device.

BRIEF DESCRIPTION OF THE DRAWINGS

Formulating accurate mixtures of concentrated cleansing liquids and water has always been difficult given the natural tendency of operatives to add too much of a concentrate in the erroneous belief that more of the concentrate will give better results.

The dispensing device of the present invention helps to overcome this falsely held belief by ensuring that an operative can only dispense a specific quantity of a concentrate when dosing water to formulate a cleansing mixture.

Figure 1:
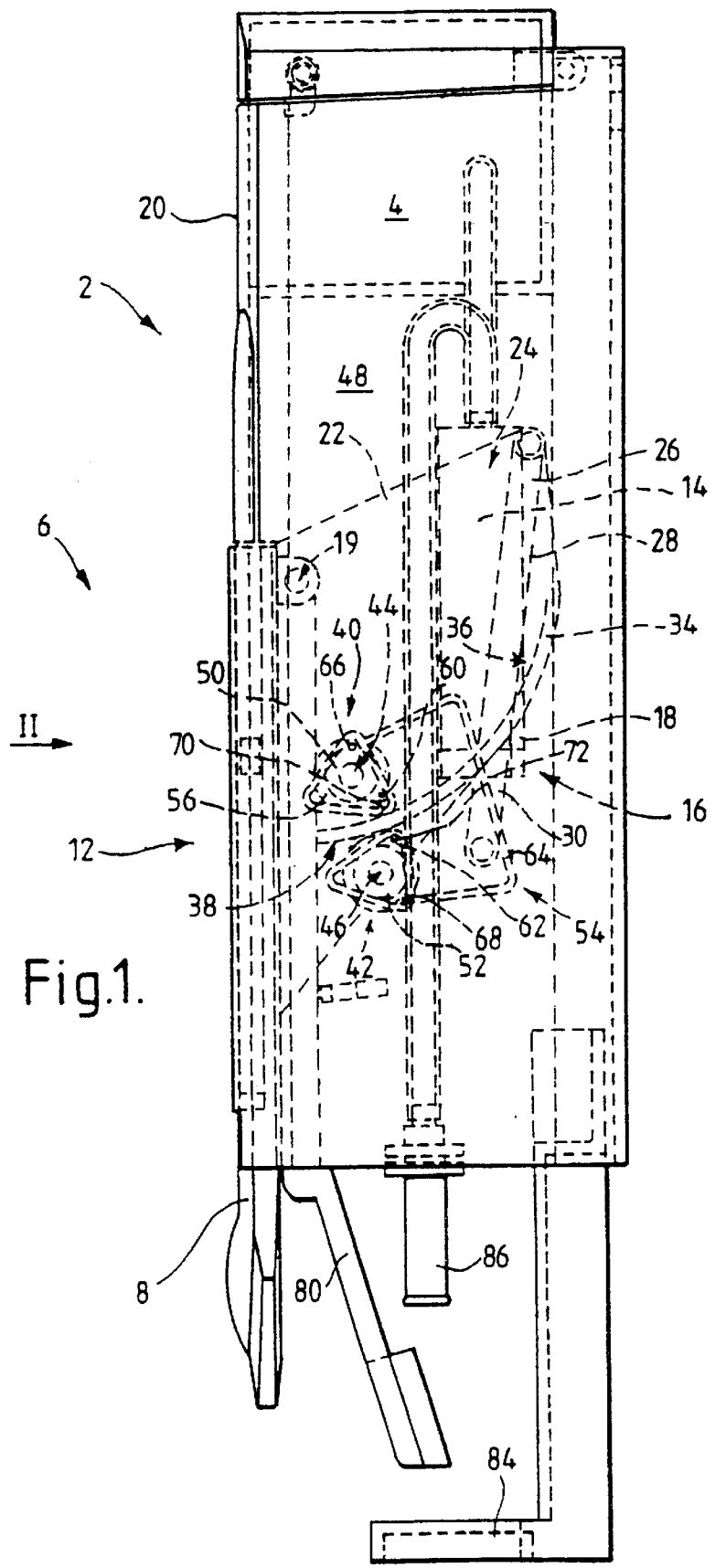
Figure 2:
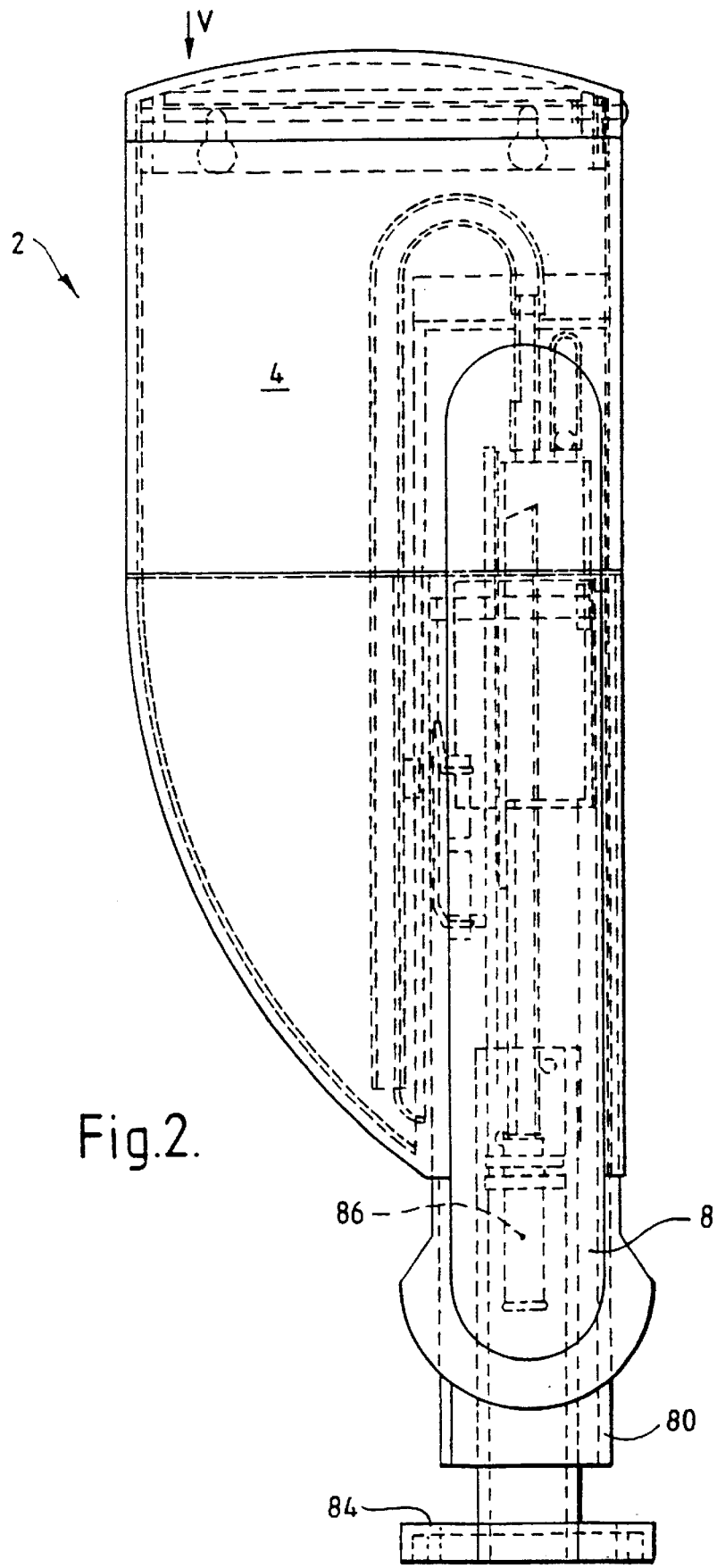

Thus, the invention generally provides a dispensing device 2 comprising a housing 4, see FIGS. 1, 2, 3 and 4, which housing 4 provides support for a priming and delivery means 6 including a lever 8, the device 2 also comprising inhibiting means 12, whereby, when the dispensing device 2 is in use, movement of the lever 8, in effecting a priming or delivery stroke of the dispensing device 2, cannot be reversed thereby ensuring the completion of the priming or delivery stroke and thus ensuring the provision in an admixture of water and a concentrated cleansing product of the appropriate dosage of the concentrate.

DETAILED DESCRIPTION OF THE INVENTION

Figure 3:
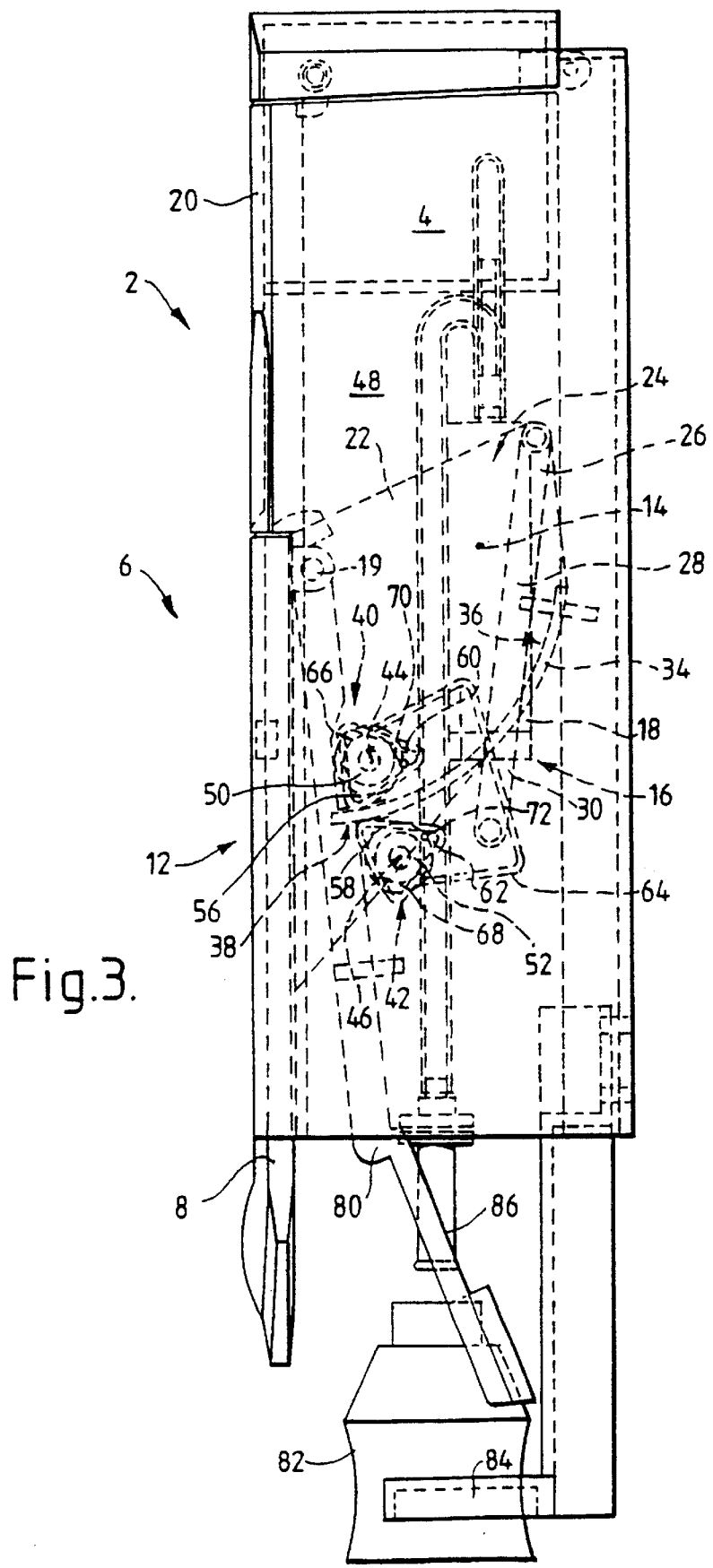
Figure 4:
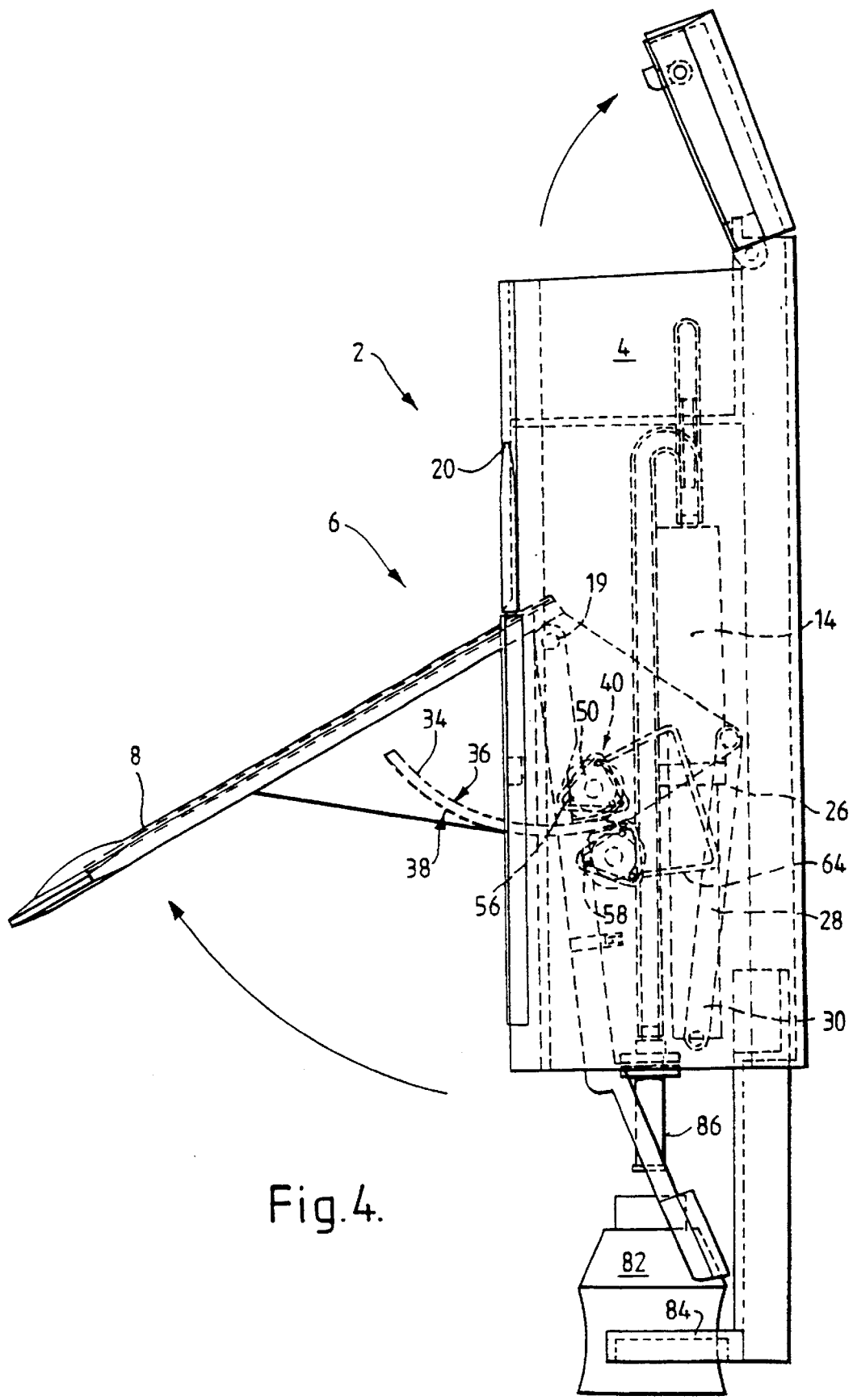
Figure 5:
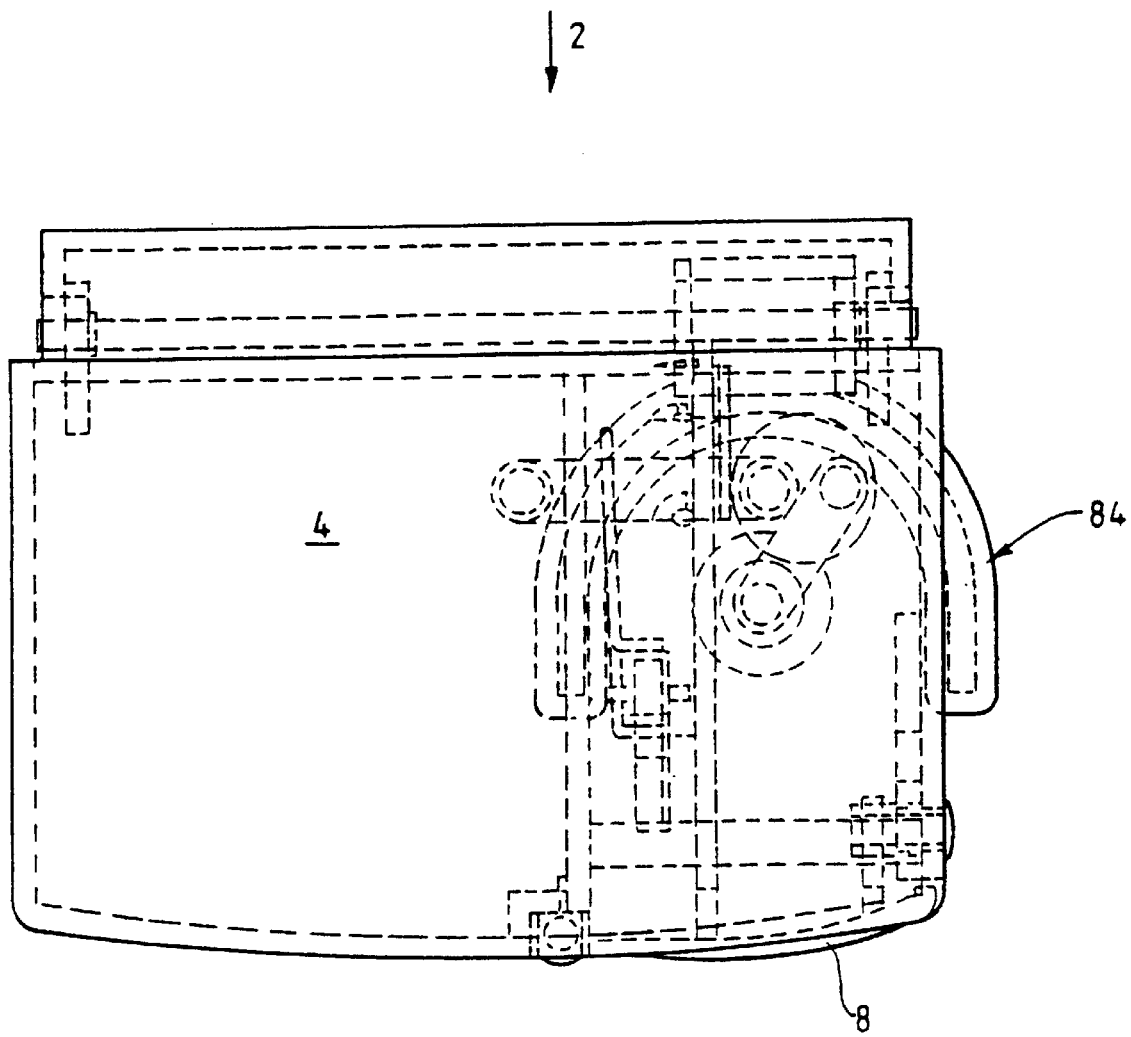

Specifically, the housing 4 also provides support for a reservoir 14 comprised of a piston and cylinder arrangement 16, see FIGS. 1, 3, and 4, a cylinder 18 of the arrangement having a capacity in excess of the maximum priming or delivery amount which may be supplied by the priming and delivery means when the dispensing device 2 is in use.

The lever 8 of the dispensing means 2 is pivotally mounted at 19 on a front wall 20 of the housing 4, the lever 8 being provided with an inwardly projecting wing portion 22, see FIGS. 1, 3, 4, 6 and 7. At a right hand portion 24 of the wing portion 22, the lever 8 provides pivotal mounting for one end 26 of a connecting bar 28, an opposite end 30 of which bar 28 is pivotally connected to a piston rod (not shown) of the piston and cylinder arrangement 16, see FIGS. 1, 3 and 4. Thus, when the dispensing device 2 is in use, movement of the lever 8 will cause corresponding movement of the piston and cylinder arrangement 16 as hereinafter described.

The wing portion 22 of the lever 8 is provided with an arcuate rib 34 the centre of curvature of which rib 34 is arranged coincident, or substantially so, with the pivotal point 19 of the lever 8. The arcuate rib 34 comprises an inside arcuate track 36 and an outside arcuate track 38, see FIGS. 1, 3, 4, 6 and 7.

The inhibiting means 12 comprises two locking members 40 and 42 pivotally mounted on respective pivot pins 44 and 46 located in a bulkhead 48 of the housing 4, the member 40 being located adjacent the inside arcuate track 36 and the member 42 being located adjacent the outside arcuate track 38, see FIGS. 1, 3 and 4.

The members 40 and 42, see FIG. 1, comprise respective triangular blocks 50 and 52 spring urged in concert by spring means 54 into first operative conditions in which first arcuate track engaging portions 56 and 58 thereof respectively are brought into engagement with the tracks 36 and 38 associated therewith for a purpose to be more fully explained hereinafter.

The triangular blocks 50 and 52, see FIG. 1, also comprise second arcuate track engaging portions 60 and 62, which portions 60 and 62, when the triangular blocks 50 and 52 are urged by the spring means 54 into second operative conditions, are brought into engagement with the tracks 36 and 38 associated therewith for a purpose to be more fully explained hereinafter.

The spring means 54 is comprised of a generally "C" shaped spring 64 connected to outer lobes 66 and 68 respectively of the triangular blocks 50 and 52, to urge the blocks 50 and 52 into one or other of their first and second operative conditions.

Figure 6:
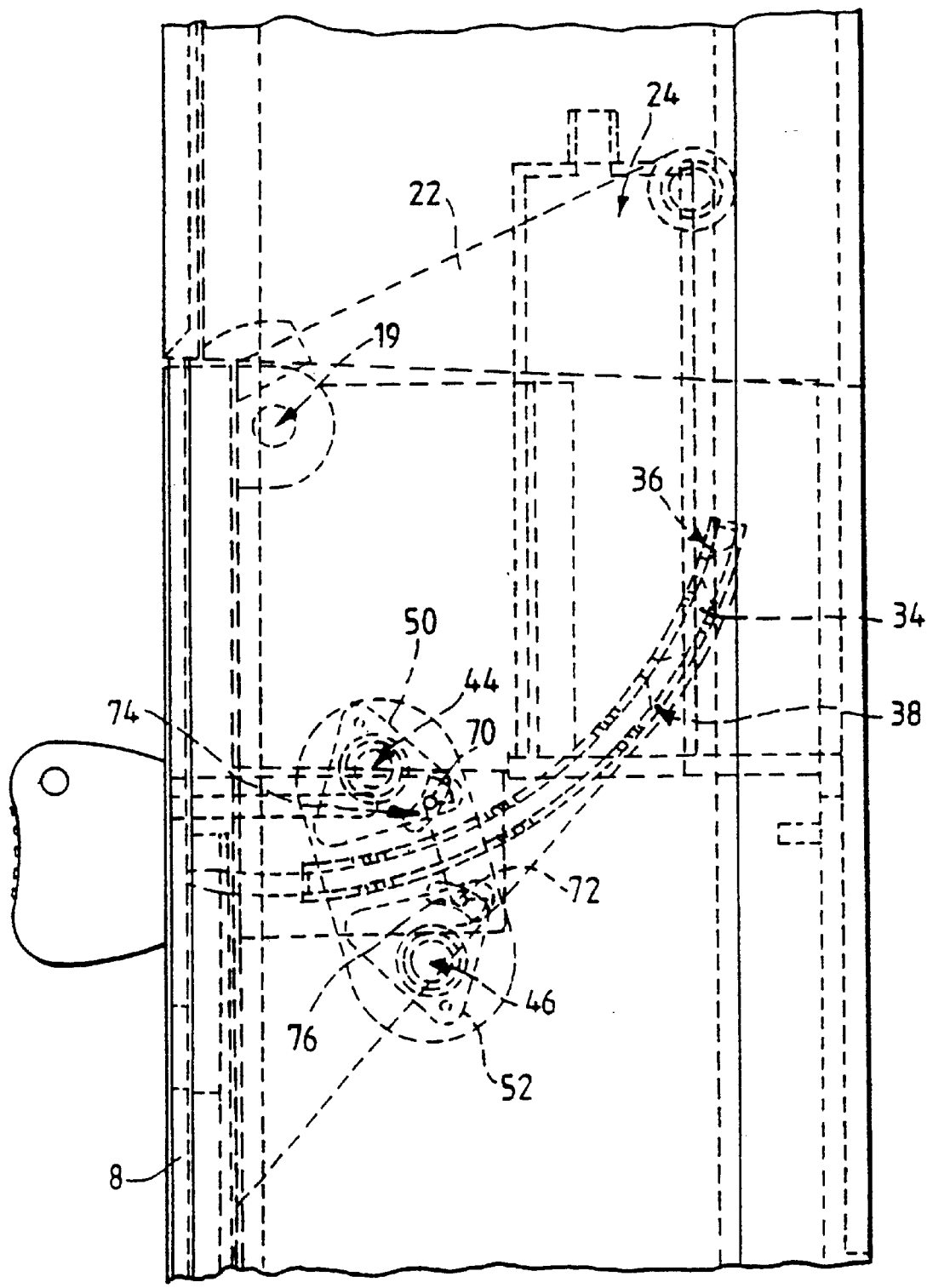
Figure 7:
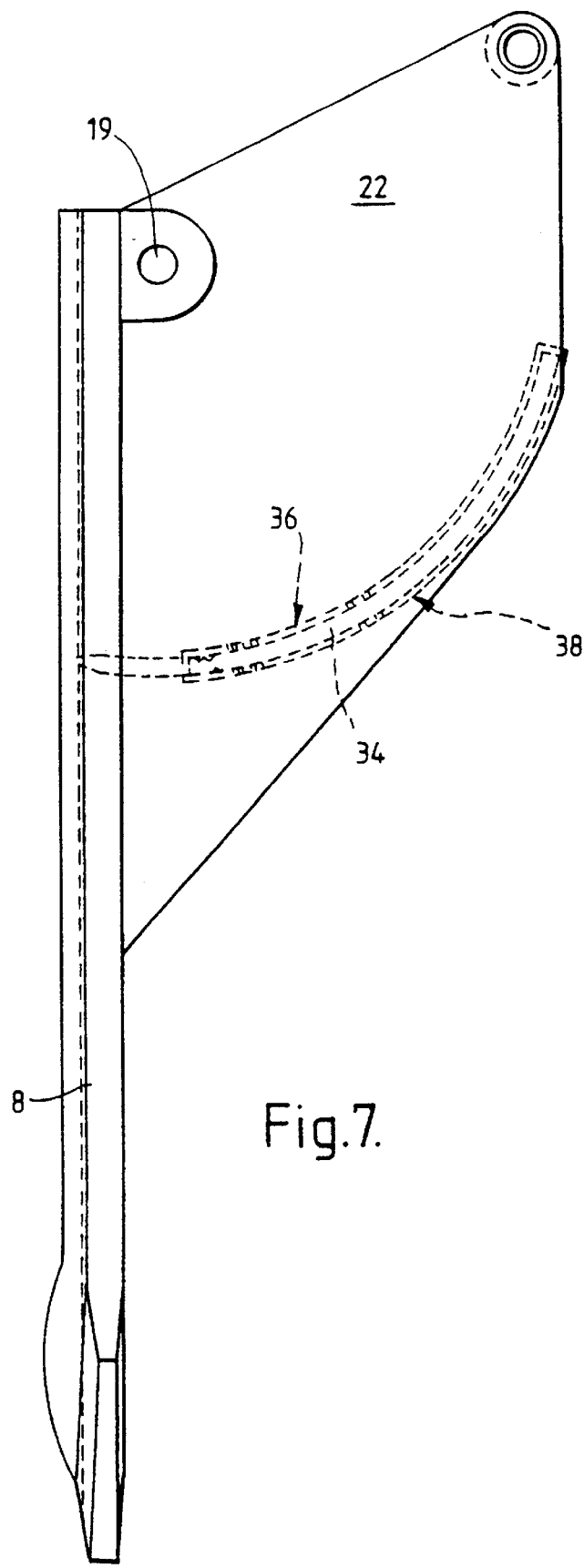

Pivotal movement of the triangular blocks 50 and 52 is limited by the provision in each of the blocks 50 and 52 of a pin 70 and 72 respectively, the pin 70 engaging in an arcuate slot 74 and the pin 72 engaging in an arcuate slot 76, the slots 74 and 76 being provided in the bulkhead 48 of the dispensing device 2 adjacent one side of the triangular blocks 50 and 52, see FIG. 6. The pins 70 and 72 extend through their respective blocks to protrude therefrom on opposite sides of the blocks 50 and 52 for a purpose to be made clear hereinafter.

At an inward end portion of the arcuate rib 34 there is provided an adjustable stop pin (not shown) which extends on both sides of the rib 34 for a purpose to be explained hereinafter.

The dispensing device 2 also comprises a locking lever 80 spring urged into a locking position, as shown in FIG. 1, in which it prevents operation of the dispensing device 2 in the absence of a bottle or container 82 to be provided with a measured amount of a concentrated cleansing liquid.

When the dispensing device 2 of the present invention is in use, an operative places a bottle 82 in a holder 84 located beneath a dispensing outlet 86 of the piston and cylinder arrangement 16, as shown in FIG. 3. In placing the bottle 82 as aforesaid the locking lever 80 is displaced to the right, viewing FIG. 3, into a position in which it no longer prevents the operation of the dispensing device 2. For this purpose the locking lever 80 is provided with an inwardly protruding "Y" shaped pin engaging member (not shown) which pin engaging member, as the locking lever 80 is moved to the right as aforesaid, engages with the pins 70 and 72 to enable the dispensing device 2.

When the dispensing device is enabled, the "C" shaped spring 64 acts on the triangular blocks 50 and 52 to urge them into a first operative condition, as shown in FIG. 3, in which a priming stroke of the dispensing device 2 may be effected.

In order to effect the priming stroke the operative moves the lever 8 to the left from the position shown in FIG. 3 to the position shown in FIG. 4, During movement of the lever 8 the connecting bar 28 acts on the piston rod of the piston and cylinder arrangement 16 to move it downwardly to draw concentrated cleansing liquid from a source, not shown, into the cylinder 14 of the arrangement 16. As this priming stroke is effected, although the arcuate rib 34 has an unhindered passage between the triangular blocks 50 and 52 until completion of the priming stroke, If the operative stops the priming stroke and attempts to reverse the lever 8, the first track engaging portions 56 and 58 bite into their respective tracks 36 and 38 to prevent such reversal. Under such circumstances the operative has no alternative but to continue with the priming stroke of the dispensing device 2.

At the end of the priming stroke the stop pin at the end of the arcuate rib 34 engages the pins 70 and 72 of the triangular blocks 50 and 52 to cause the blocks 50 and 52 to pivot about their respective pivot pins 44 and 46 from their first operative conditions into their second operative conditions in which respective second arcuate track engaging portions 60 and 62 thereof engage their respective tracks 34 and 36, see FIG. 4. The operative then moves the lever 8 to the right viewing FIG. 4 thereby reversing the stroke of the piston rod of the piston and cylinder arrangement 16 and effecting delivery of the measured amount of the concentrated cleansing liquid into the bottle located under the dispensing outlet 86 of the dispensing device 2.

As the delivery stroke of the device 2 is effected, although the arcuate rib 34 has an unhindered passage between the triangular blocks 50 and 52 until completion of the delivery stroke, if the operative attempts to interrupt the delivery stroke of the device 2 in order to reverse the delivery stroke, the second arcuate track engaging portions 60 and 62 will bite into their respective tracks 36 and 38 to prevent such reversal. Under such circumstances the operative has no alternative but to continue the delivery stroke of the dispensing device 2.

At the end of the delivery stroke the operative may remove the bottle 82 from the dispensing device 2 whereupon the locking lever 80 is spring urged against a damping mechanism (not shown) back into its locking condition as shown in FIG. 1 and the dispensing device 2 is ready for the next bottle 82 to be placed in the holder 84 to repeat the sequence of operations.

Although the stop pin at the end of the arcuate rib 34 is described as a fixed pin, in an alternative arrangement the pin may be adjustable in order to vary the length of the priming and delivery strokes of the dispensing device 2 and thus the quantity of the concentrated cleansing liquid delivered to a bottle 82.

In addition, in order to enhance the effect of the triangular blocks 50 and 52, the track engaging portions thereof may be provided with a rough surface or they may be provided with a coating of friction material, for example polytetrafluoroethylene. Likewise, the tracks 36 and 38 of the arcuate rib 34 may be coated in addition to the track engaging portions of the blocks 50 and 52 or instead of so coating those portions.

The dispensing device 2 may be provided with an over-ride key 90 as shown in FIG. 6, which over-ride key 90 is adapted to engage with the triangular blocks 50 and 52 to move and locate them in an ineffectual position mid-way between the positions of their first and second operative conditions.

PARTS LIST 2 dispensing device
4 housing
6 priming & delivery means
8 lever
10
12 inhibiting means
14 reservoir
16 piston & cylinder arrangement
18 cylinder
19 pivot
20 front wall
22 inwardly projecting wing portion
24 right hand portion (of wing)
26 end (of 28)
28 connecting bar
30 opposite end (of 28)
32 piston rod
34 arcuate rib
36 inside arcuate track
38 outside arcuate track
40 locking member (of 12)
42 locking member (of 12)
44 pivot pin
46 pivot pin
48 bulkhead
50 triangular block
52 triangular block
54 spring means ("C" shaped)
56 first arcuate track engaging portion
58 first arcuate track engaging portion
60 second arcuate track engaging portion
62 second arcuate track engaging portion
64 "C" shaped spring
66 outer lobe
68 outer lobe
70 pin
72 pin
74 arcuate slot
76 arcuate slot
78 stop pin
80 locking lever
82 bottle (container)
84 holder
86 dispensing unit

What is claimed is:

1. A dispensing device for delivering a metered quantity of a liquid, the dispensing device comprising a reservoir, priming means for priming the reservoir, when the dispensing device is in use, with a metered quantity of a liquid, the dispensing device also comprising a delivery means for delivering, when the dispensing device is in use said metered quantity of said liquid from the reservoir, wherein the dispensing device further comprises inhibiting means for:
   a) preventing the interruption and reversal of a priming stroke of the priming means; and
   b) preventing the interruption and reversal of a delivery stroke of the delivery means,
      and wherein the priming and delivery means comprises a lever pivotally mounted on the dispensing device, characterised in that the lever includes at least two arcuate surfaces and the inhibiting means comprises at least two locking members located one each adjacent a respective one of the arcuate surfaces, wherein, when the dispensing device is in use, the locking members operate in concert and are moved between:
   a) a first operative condition in which a first arcuate surface engaging portion of each locking member is brought into engagement with its respective arcuate surface to prevent the interruption and reversal of the priming stroke of the priming means until the priming stroke thereof is completed; and,
   b) a second operative condition in which a second arcuate surface engaging portion of each locking member is brought into engagement with its respective arcuate surface to prevent the interruption and reversal of the delivery stroke of the delivery means until the delivery stroke is completed.

2. A dispensing device according to claim 1 characterised in that the locking members each comprise a triangular block pivotally mounted on the dispensing device.

3. A dispensing device according to claim 2 characterised in that, when the dispensing device is in use, the triangular blocks are moved simultaneously into their first operative condition or into their second operative condition by spring means.

4. A dispensing device according to claim 3 characterised in that the spring means comprises a generally "C" shaped leaf spring opposite ends of which leaf spring are arranged to act one on each of the triangular blocks respectively to urge the triangular blocks into their first operative condition or their second operative condition at or towards opposite ends of the arcuate surfaces associated therewith.

5. A dispensing device according to claim 4 characterised in that the dispensing device comprises stop elements located at the opposite ends of the arcuate surfaces, the stop elements being effective, when the dispensing device is in use:
   a) to engage the triangular blocks at a first end of the arcuate surfaces to cause the triangular blocks to pivot simultaneously about their respective fulcrum points into their first operative condition in which they are set to prevent the interruption and reversal of a subsequent priming stroke of the priming means; or,
   b) to engage the triangular blocks at a second end of the arcuate surfaces to cause the triangular blocks to pivot simultaneously about their respective fulcrum points into their second operative condition in which they are set to prevent the interruption and reversal of a subsequent delivery stroke of the delivery means.

6. A dispensing device according to claim 5 characterised in that the relative positions of the respective stop elements at the opposite ends of the arcuate surfaces are variable in order to alter the length of the priming and delivery strokes of the priming and delivery means respectively.

7. A dispensing device according to claim 2 characterised in that the arcuate surface engaging portions of the triangular blocks and/or the respective arcuate tracks engaged thereby are each provided with a friction coat or surface finish to enhance the locking engagement of the triangular blocks with their respective arcuate surfaces should an operative try to interrupt and reverse the priming or delivery strokes of the priming means or the delivery means respectively when the dispensing device is in use.

8. A dispensing device according to claim 2 characterised in that the dispensing device comprises an over-ride means for engagement with the triangular blocks, when the dispensing device is in use, to move the triangular blocks into inoperative conditions in which arcuate surface engaging portions of the triangular blocks are held out of engagement with a respective one of the arcuate surfaces.

9. A dispensing device according to claim 1 characterised in that the lever includes two arcuate surfaces formed one on either side of an arcuate rib formed integrally with the lever.

10. A dispensing device according to claim 9 characterised in that a centre of curvature of the arcuate rib is coincident, or substantially so, with a pivotal axis of the lever.

11. A dispensing device according to claim 9 characterised in that the dispensing device comprises one locking member provided by a triangular block on opposite sides of the arcuate rib adjacent their respective arcuate surfaces of the arcuate rib.

12. A method of dispensing a metered quantity of a liquid from a dispensing device according to claim 1, the method comprising the steps of priming a reservoir with a metered quantity of the liquid and delivering the metered quantity of the liquid from the reservoir characterised in that the method also comprises the steps of:
   a) preventing the interruption and reversal of the priming stroke until the reservoir has received the full metered quantity of the liquid; and
   b) preventing the interruption and reversal of the delivery stroke until the reservoir has been emptied of the full metered quantity of the liquid.

* * * * *